United States Patent [19]

Tisma

[11] Patent Number: 5,343,671
[45] Date of Patent: Sep. 6, 1994

[54] MEANS FOR AND METHODS OF LOADING IRREGULARLY SHAPED OBJECTS INTO AUTOMATIC PACKAGING MACHINES

[75] Inventor: Stevan Tisma, Chicago, Ill.

[73] Assignee: Tisma Machinery Corporation, Elk Grove Village, Ill.

[21] Appl. No.: 977,578

[22] Filed: Nov. 17, 1992

Related U.S. Application Data

[63] Continuation of Ser. No. 762,497, Sep. 19, 1991, Pat. No. 5,170,610, which is a continuation of Ser. No. 508,269, Apr. 11, 1990, Pat. No. 5,072,573, which is a continuation of Ser. No. 464,162, Jan. 12, 1990, abandoned.

[51] Int. Cl.$^5$ ............................ B65B 1/04; B65B 5/06
[52] U.S. Cl. ................................... 53/437; 53/251; 53/257; 53/473; 53/566
[58] Field of Search ................ 53/252, 251, 250, 249, 53/257, 255, 260, 261, 566, 564, 437, 439, 473

[56] References Cited

U.S. PATENT DOCUMENTS

| 4,211,054 | 7/1980 | Sramek | 53/566 X |
| 4,250,693 | 2/1981 | Andersson | 53/252 X |
| 4,730,443 | 3/1988 | Matsuda et al. | 53/252 X |
| 4,982,556 | 1/1991 | Tisma | 53/252 X |

*Primary Examiner*—James F. Coan
*Attorney, Agent, or Firm*—Laff, Whitesel, Conte & Saret

[57] ABSTRACT

A portable loader may be brought up to and selectively positioned to deliver product into mandrels carried by an automatic packaging machine. The loader may receive product on an asynchronous and on-demand basis and delivers product on a time basis coordinated with operation of the automatic packaging machine. The loader has two bins which are opened and closed in sequence to receive and deliver product with a buffer time storage in a second of the two bins in order to accommodate the timing of the packaging machine. The loader handles pouches and similarly irregularly shaped product, having a geometry which may vary at random. The pouches are gently shaped to fit into a box as they are transferred from a source of product into a loading position of the packaging machine.

4 Claims, 13 Drawing Sheets

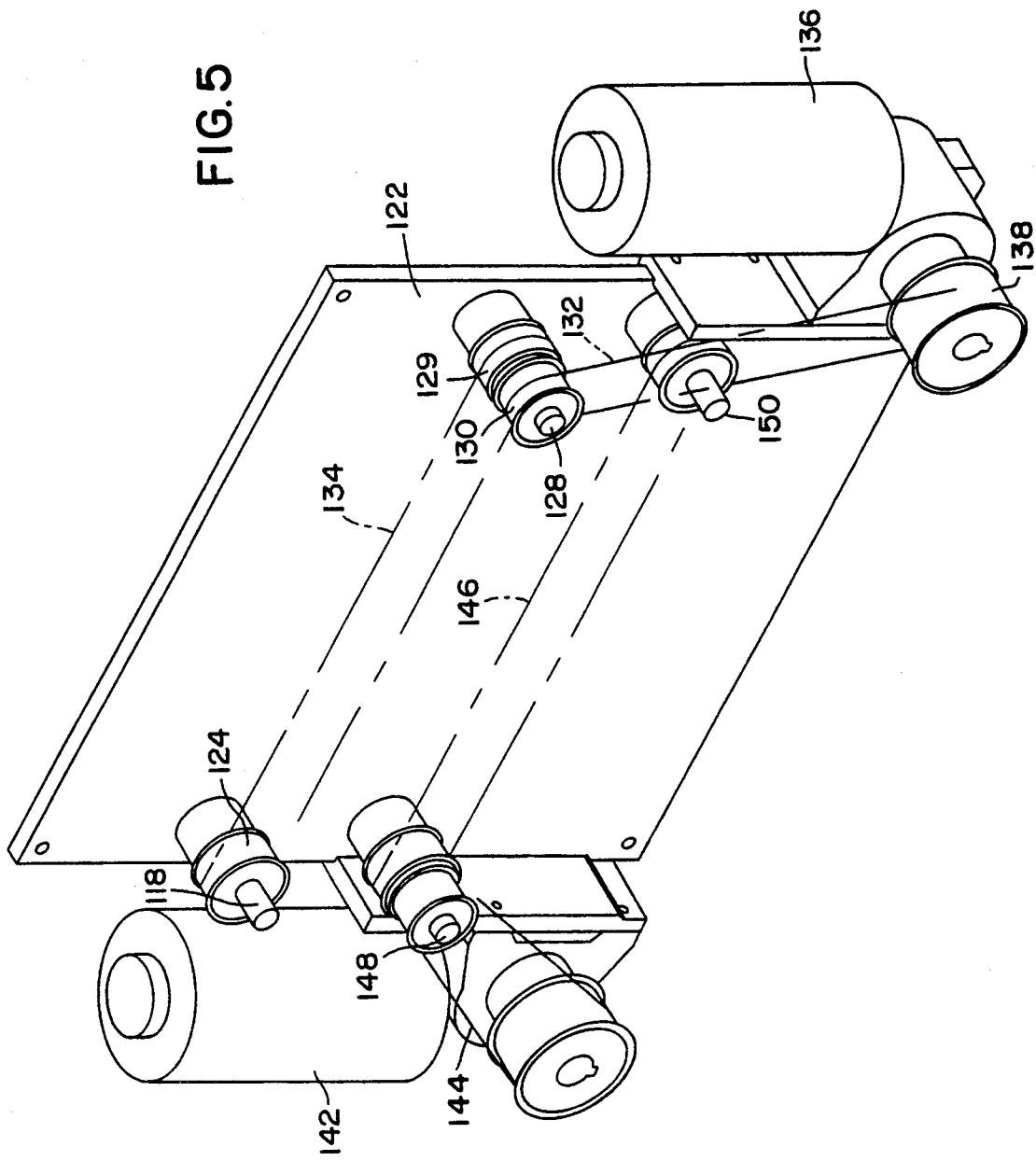

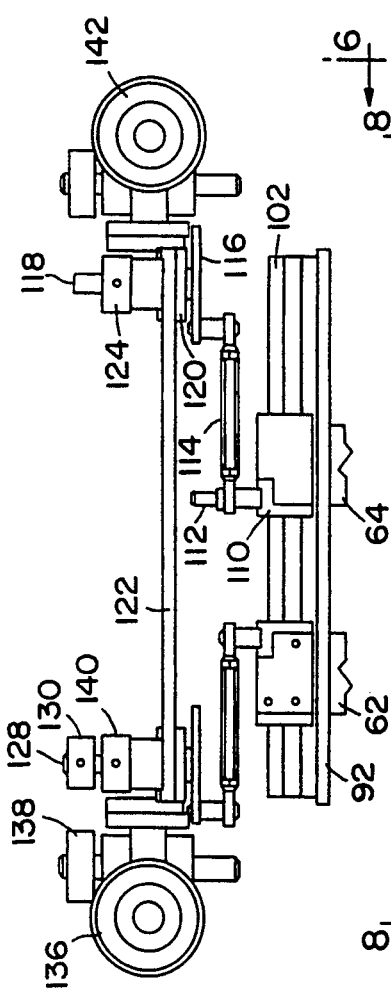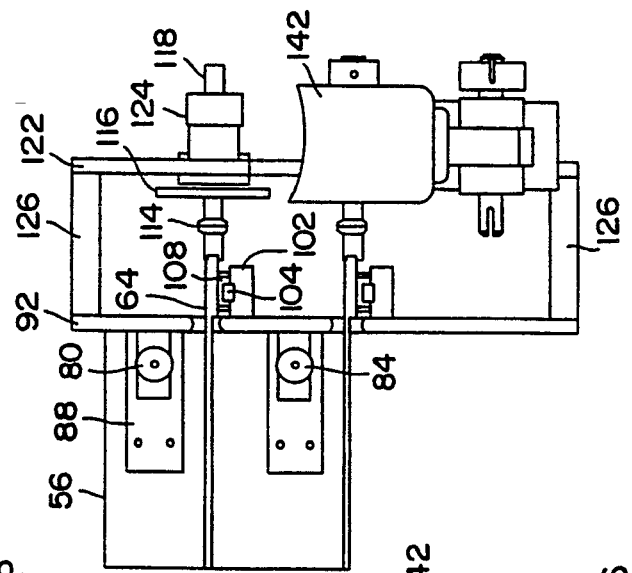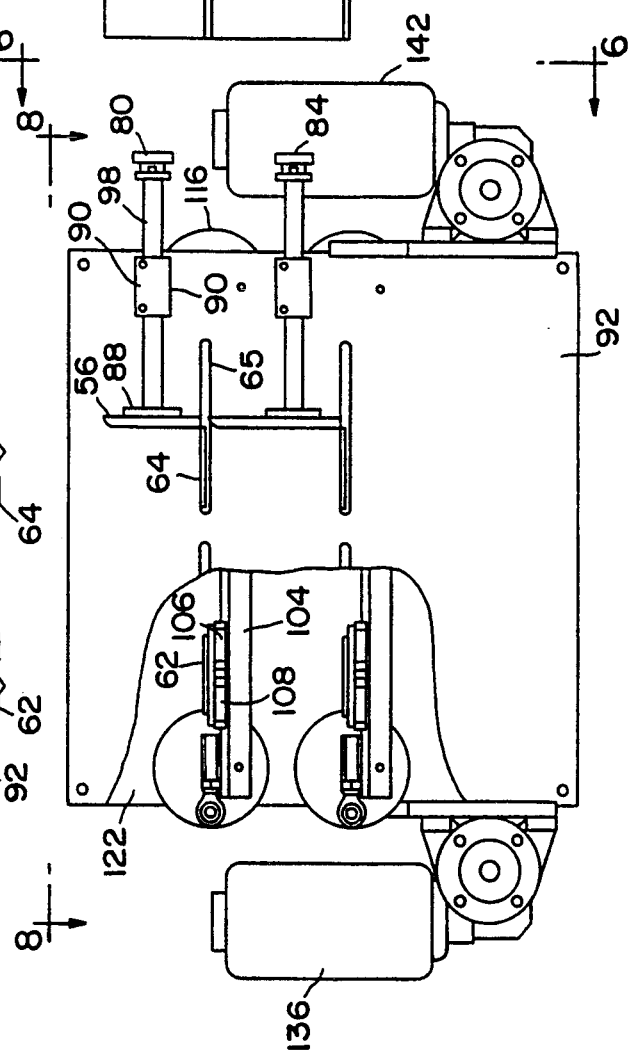

MEANS FOR AND METHODS OF LOADING IRREGULARLY SHAPED OBJECTS INTO AUTOMATIC PACKAGING MACHINES

This is a continuation-in-part of Ser. No. 07/762,497, filed Sep. 19, 1991 (now U.S. Pat. No. 5,170,610); which was a continuation-in-part of Ser. No. 07/508,269, filed Apr. 11, 1990 (now U.S. Pat. No. 5,072,573) which in turn was a continuation-in-part of Ser. No. 07/464,162 filed Jan. 12, 1990, now abandoned.

This invention relates to automatic packaging machines and more particularly to "Smart Loaders" especially for loading irregularly shaped products into boxes or other containers carried by the automatic packaging machine. Examples of irregularly shaped products which this invention handles are bags of potato chips, pouches filled with granular matter (sugar or flour, for example), bags of small candy pieces, tablets, nuts and the like. Many other examples will readily occur to those who are skilled in the art. The loader must also be adapted to accept a product in almost any other geometric configuration which may occur, such as uniformly shaped boxes. Accordingly, the term "pouch" is used herein to mean any of these and similar objects, boxes or the like.

Another problem is that the layout of associated automatic packaging equipment already in position on a factory floor may present different demands upon the loader. Sometimes, the inflow of pouched product is at right angles to the flow of empty cartons on a box conveyor. Other times, the inflow of product may be parallel to the flow of empty cartons on the conveyor. Likewise, the loader may be positioned at any of many different possible locations along the length of and relative to the automatic packaging machine. Thus, it is desirable for a pouch loader to be portable so that it may be moved from location to location.

Yet another problem is found in a large packaging installation where different machines may load different kinds of products at different times. Thus, for example, at one time, the loader may be used with a machine which handles one large pouch at a time and, at another time, with another machine which handles many small pouches may at another time.

Still another problem relates to an interaction between machines. For example, one machine may be adapted to detect the presence or absence of an empty box on a conveyor and then deposit or withhold the deposit of a product into the box so that no attempt will be made to load a product into a non-existent box. If so, the loader should start and stop to match the deposit or non-deposit of the product in the box. In another example, it may be desirable to load different numbers of pouches in a box. Thus, for example, at one time, a single bag of brown sugar would be loaded in a single box; or, at another time, perhaps seven to ten pouches of dehydrated soup may be loaded into a single box. In yet another example, perhaps a hundred tea bags may be loaded into box. Thus, the loader should be programmed to put any suitable number of products in a single box.

Yet another problem relates to the time cycle of an automatic packaging machine which operates on a precisely synchronized basis, while product is delivered asynchronously to a loader in an "on-demand" basis so that the loader must adjust a sporadic and random receipt of product with a closely synchronized delivery of product.

Hence, the loader is not faced with the relatively simple problem of handling rectangular boxes which are always approximately the same size and shape, delivered in a neat and orderly manner.

Accordingly, an object of the invention is to provide a portable pouch loader which may be brought up to any suitable machine and then adjusted to perform a specific loading function at that machine. Here an object is to provide an adjustable count loader which may load either single pouches or any suitable number of pouches into a box.

Yet another object of the invention is to provide an adaptable loader which may fit into the time format of programmed operations of many different machines and function as if it were part of the original design of that machine. Here an object is to provide a time buffer storage to coordinate a random asynchronous receipt of product with a synchronized delivery of product.

Still another object of the invention is to provide a pouch loader of the described type which may be quickly and easily set up responsive to relatively simple adjustments, as distinguished from many prior art set ups which require a considerable effort to be sure that the set up is correct for driving a machine through an entire load cycle. In this connection, a further object is to avoid the need for numeric controls which would require an operator to have special training and skills similar to those of a computer terminal operator.

A further object of the invention is to be gentle with the unstable geometry of pouches, preconditioning them into a more uniform size, shape, and alignment during loading. Here an object is to avoid damaging product by roughly handling the pouches during loading.

In keeping with an aspect of this invention, these and other objects are accomplished by a portable conveyor mounted on a stand to be moved up to an automatic packaging machine. The conveyor moves pouches into a first and upper bin with sides which are laterally adjustable to more or less loosely confine the pouch, which tends to align it and precondition its position prior to loading into a carton. Then a pair of blades forming the bottom of the bin open to allow the pouch to fall through to a second and lower bin. The two bins may be programmed in any suitable manner to accumulate one or more pouches to be packaged in a single box. The blades forming bottoms of the bins open to drop the pouch or an accumulated number of pouches into a mandrel which is part of the automatic packaging machine. That mandrel closes its sides to shape the pouch prior to its insertion into a box. The bins asynchronously receive the pouches from any suitable source, store them to provide a buffer time period, and then deliver them to the mandrels in synchronism with the automatic packaging machine work cycle.

A preferred embodiment of the invention is shown in the attached drawings, wherein;

FIG. 5 is a perspective view of the driving equipment at the rear of the two bins, which is helpful for explaining how it is operated;

FIG. 6 is a side elevation view of the two bins taken along line 6—6 of FIG. 7;

FIG. 7 is a front elevation of the two bins, with a part of a front mounting plate broken away on the left side to reveal parts behind the front mounting plate for activating the blades;

FIG. 8 is a top plan view of the two bins, taken along line 8—8 of FIG. 7;

Figure 9:
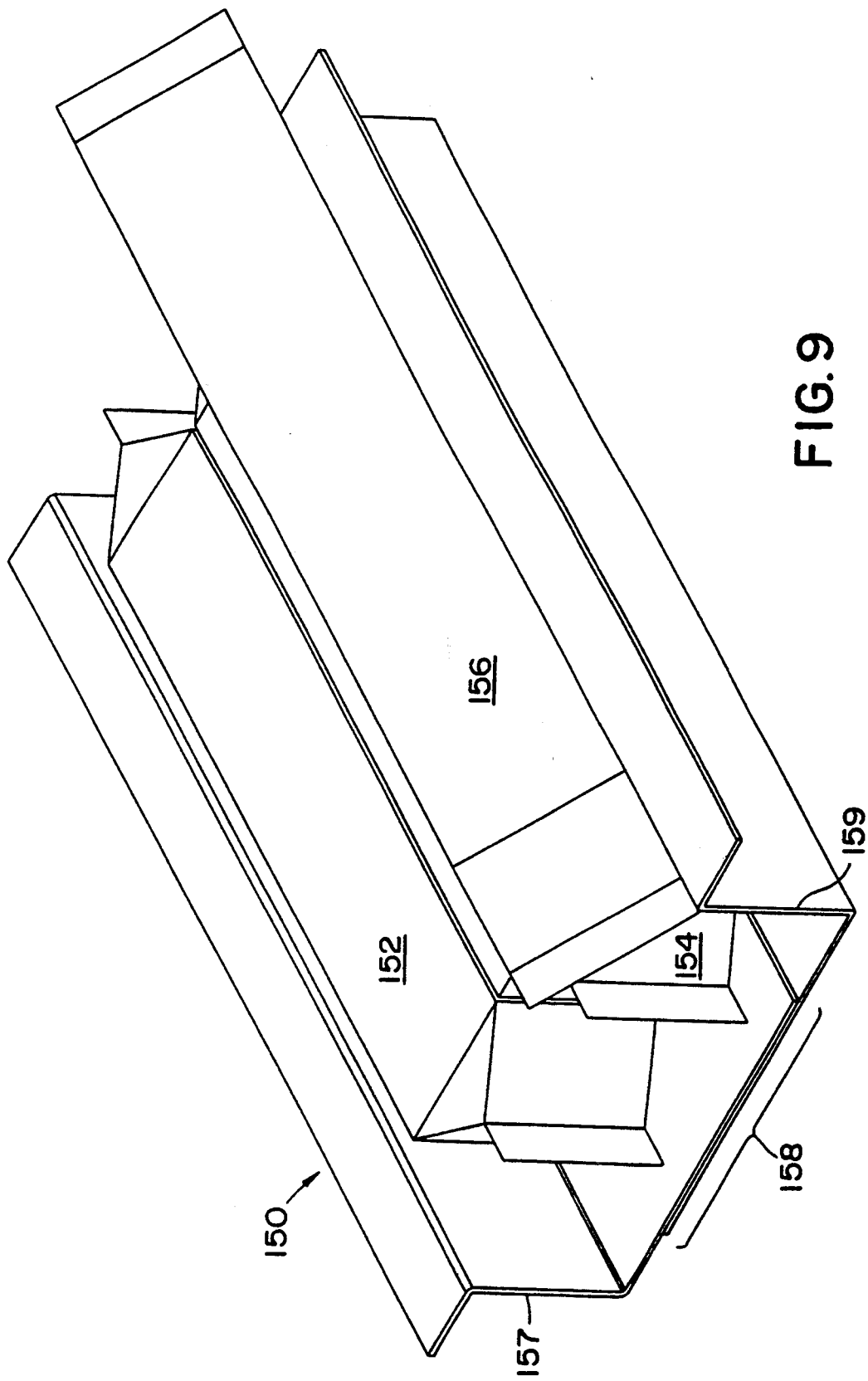
FIG. 9 illustrates a problem sometimes encountered when loading pouched materials.
Figure 10:
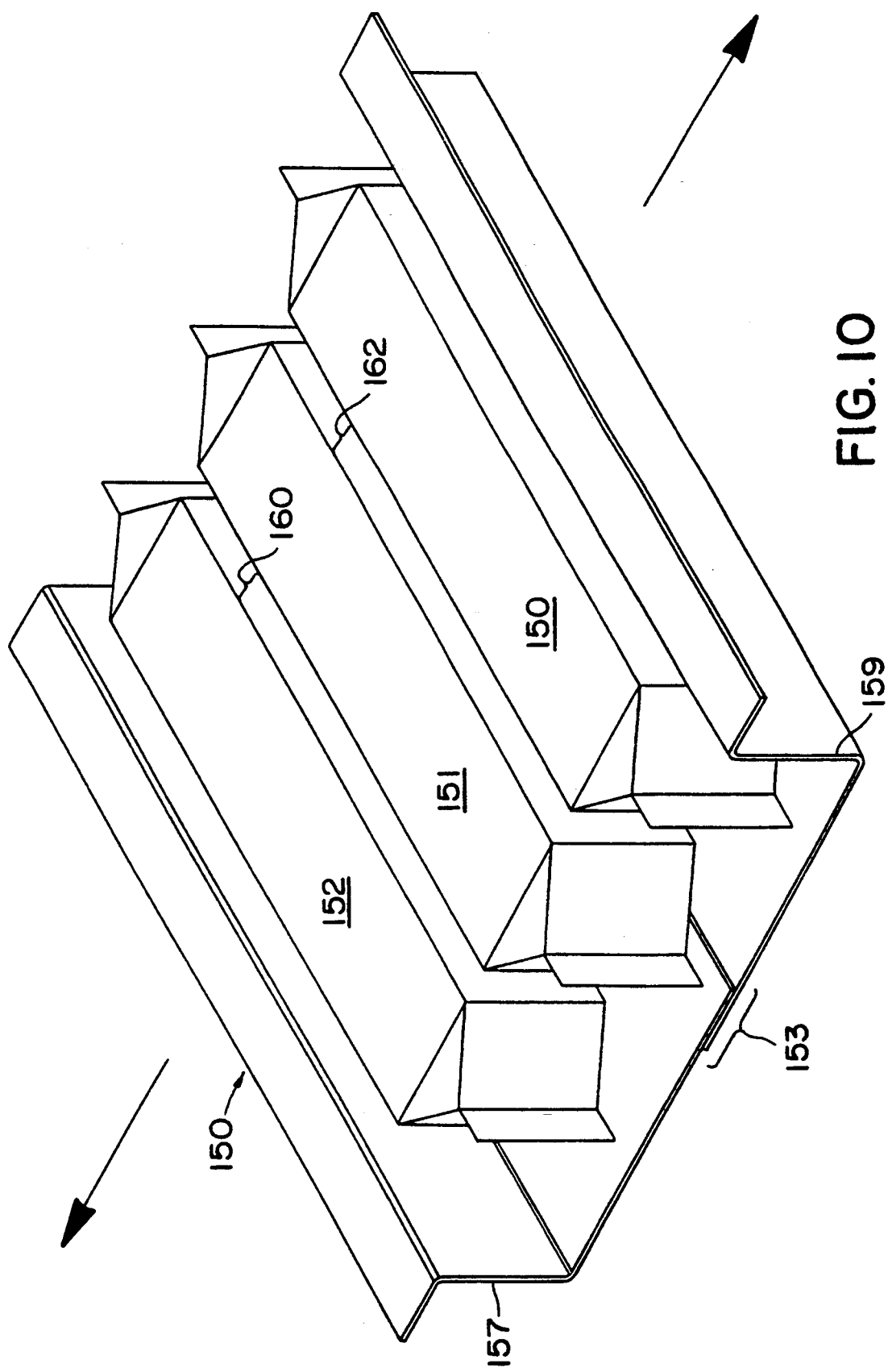
FIG. 10 is the same view as shown in FIG. 9, except that the tray is made wider to solve the problem of misaligned pouches as shown in FIG. 9.
Figure 11:
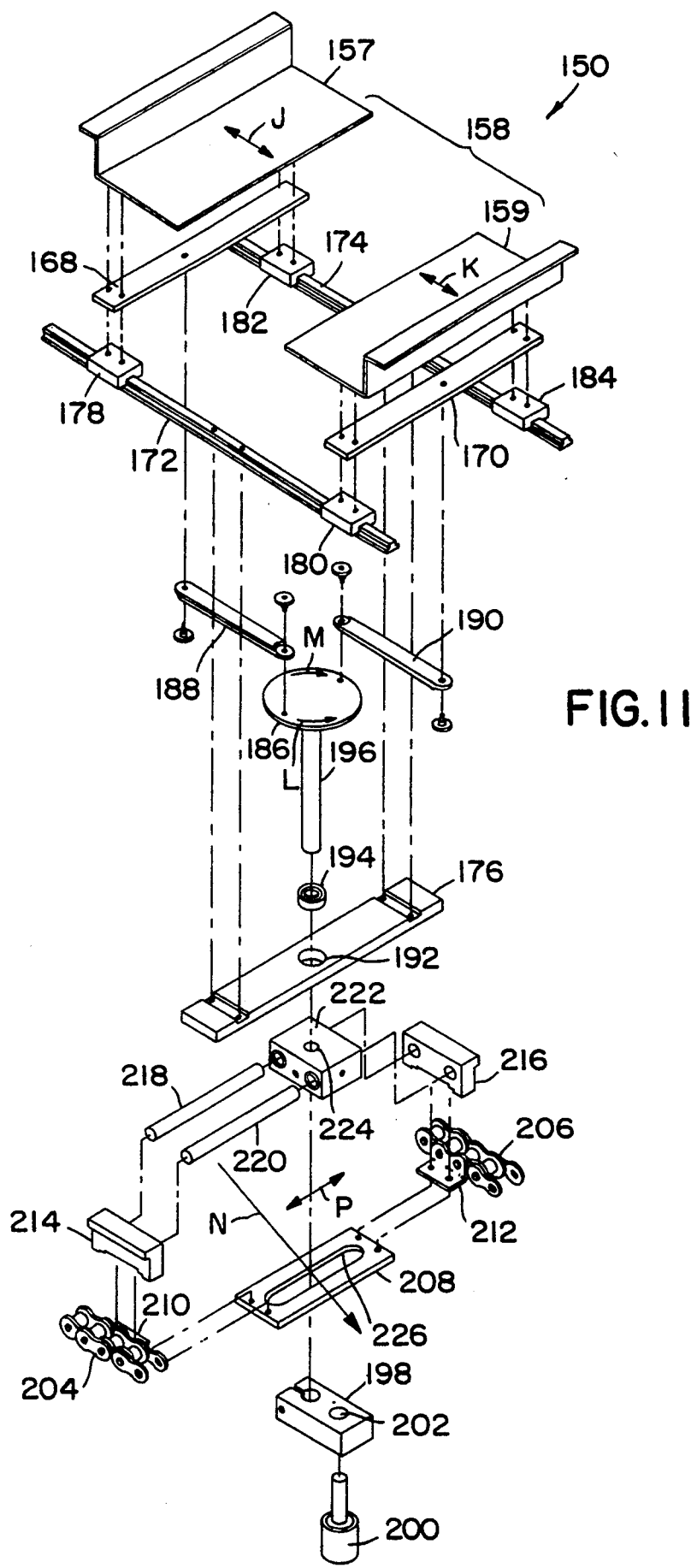
FIG. 11 is an exploded view of a mandrel which receives and shapes a pouch.

FIGS. 9–11 were taken from parent application Ser. No. 508,269 filed Apr. 11, 1990.

Figure 1:
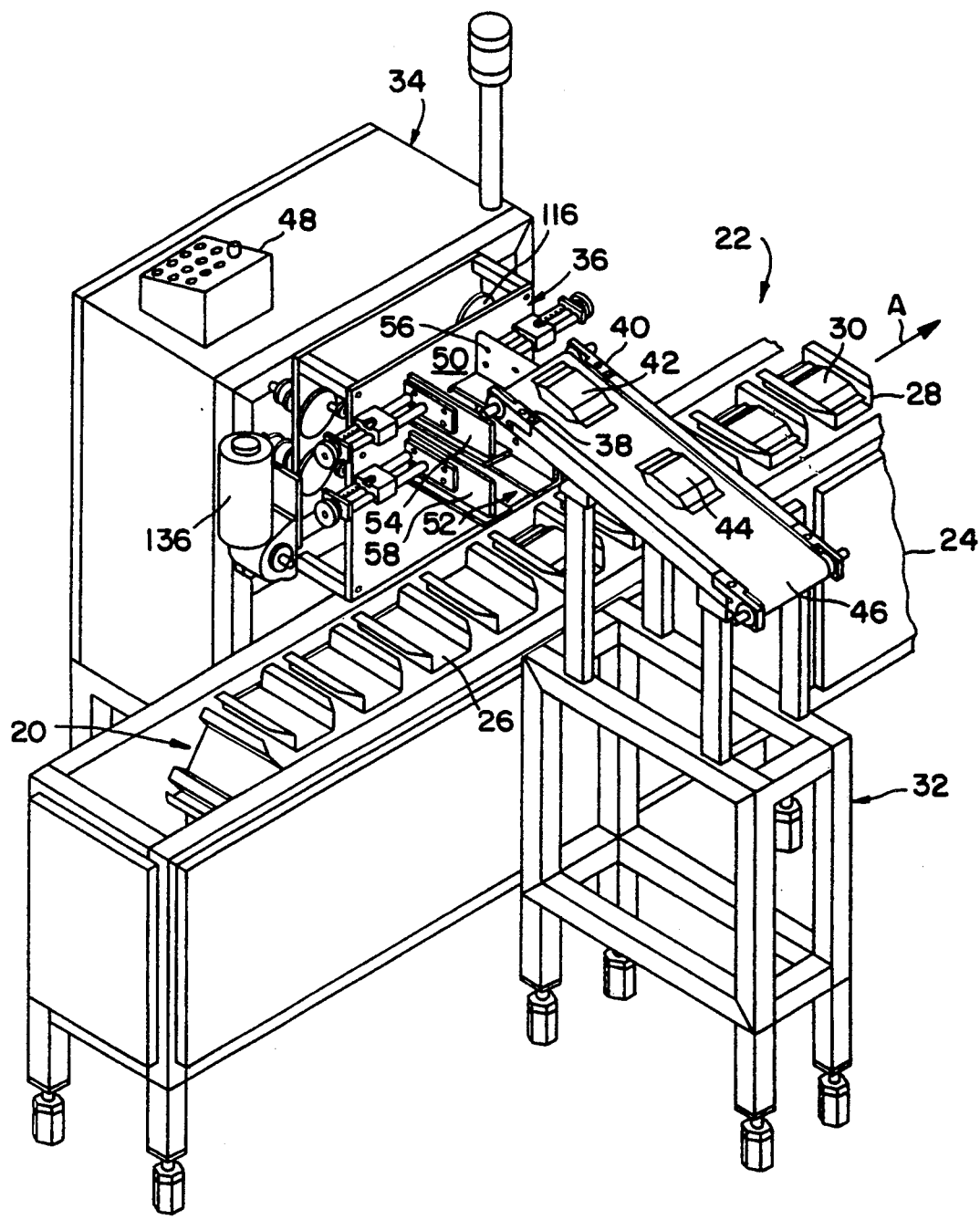
FIG. 1 is a perspective view of the inventive loader and an exemplary automatic packaging machine adapted to use the inventive loader.

FIG. 1 includes a conveyor 20 which extends beyond the broken line 24 to any suitable automatic packaging machine 22. The conveyor 20 carries a plurality of mandrels, such as 26, for receiving the pouches and carrying them up stream (Direction A) to-an awaiting carton or box. By way of example, a mandrel 28 is here shown as so carrying pouch 30.

The inventive automatic loader includes a first or pouch conveyor member 32 and a second or control member 34 which includes a two bin loading device 36. Members 32, 34 are portable and may be moved in any suitable manner to any suitable locations and used there in connection with any suitable automatic packaging machine. The only requirement is that the conveyor 32 is positioned to drop product into a bin on member 34 and that the bin is positioned to drop product into a suitable receptacle in the automatic packaging machine. The products are asynchronously received by conveyor 32 and are delivered in synchronism with conveyor 20, with a buffer time storage in bins 36 to coordinate with the automatic packaging machine time base. Beyond this it is irrelevant whether the inventive loader and packaging machine are aligned one way or another or whether the two loader parts 32, 34 are on the same or opposite sides of mandrel conveyor 20.

The conveyor member 32 is self-powered to drive a conveyor belt 46. Sensors 38, 40 are any suitable devices, such as a light and photo cell combination, to stop the conveyor belt 46 and a pouch 42 before it is delivered or to start it to be delivered to the bins in member 34. The equipment which deposits pouches 42, 44 on the conveyor belt 46 is not shown. Any suitable means may so deposit the pouches; or, they may be manually loaded onto conveyor 46. Either way, the source of pouches may operate on any suitable time basis including in a random and asynchronous manner. Thus, the term "asynchronous" is used herein after to mean any suitable timing at which pouches are deposited on conveyor 46.

The control member 34 of the inventive loader includes a microprocessor 48 which may be programmed to command the loader to perform any suitable function. The automatic packaging machine will deliver signals which are indicative of its mode of operations. For example, automatic packaging machines conventionally include many sensors which detect conditions such as the presence or absence of a box, or other conditions, having an effect upon the delivery of a product to a box. The microprocessor may be programmed to advance conveyor 46 or to unload the bins only if and when a product should be delivered to the box. Moreover, the bins may be programmed to count and deliver one or more pouches to each mandrel. Suitable microprocessor programs may eliminate sensors 38, 40 by relying upon command signals received from elsewhere in the automatic packaging machine by counting down to stop or start the loader conveyor 46. Thus, the microprocessor controls the flow of product to coordinate an asynchronous receipt of product with a synchronous delivery of product.

Figure 2:
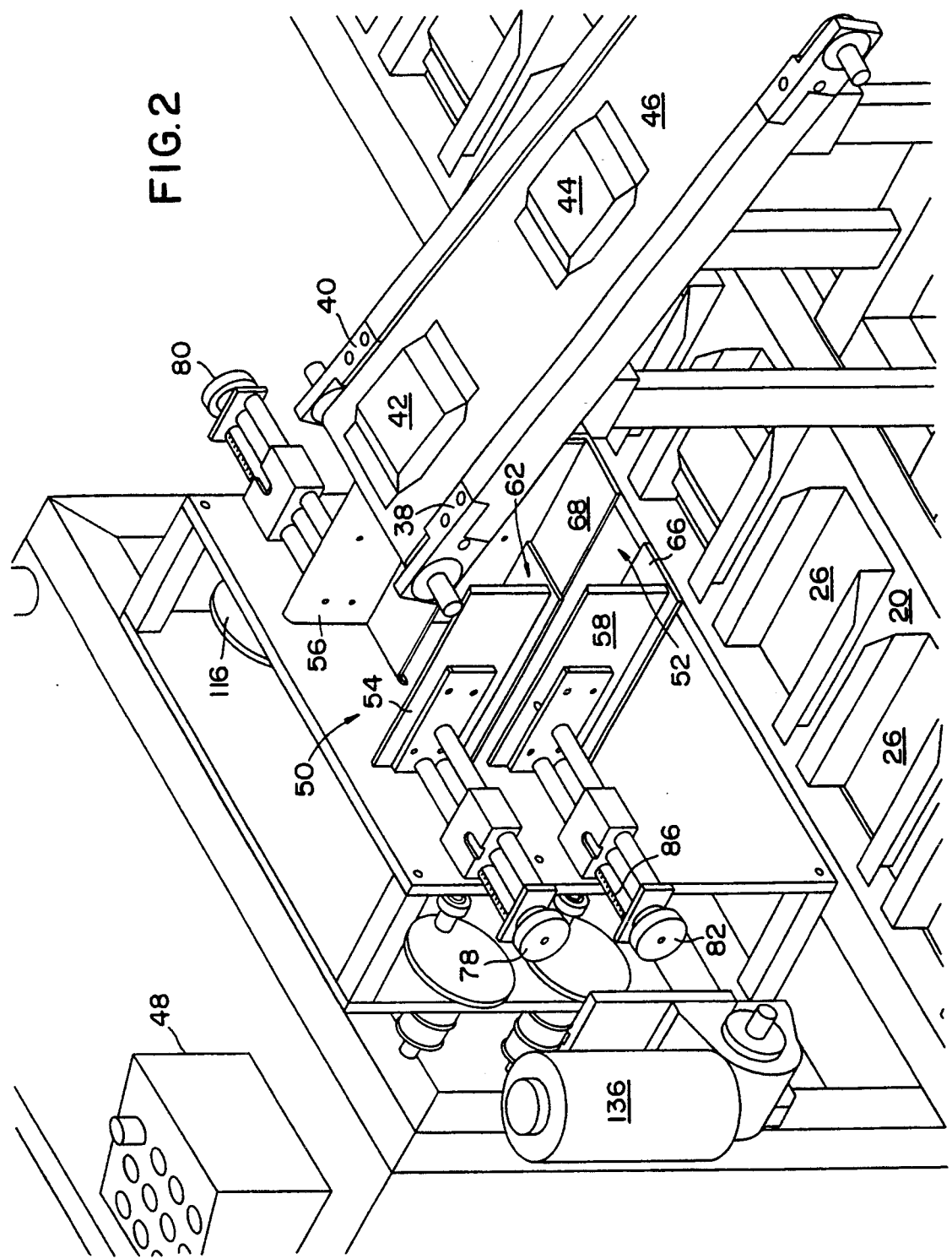
FIG. 2 is an exemplary view of a portion of a conveyor and the inventive pouch loader.
Figure 3:
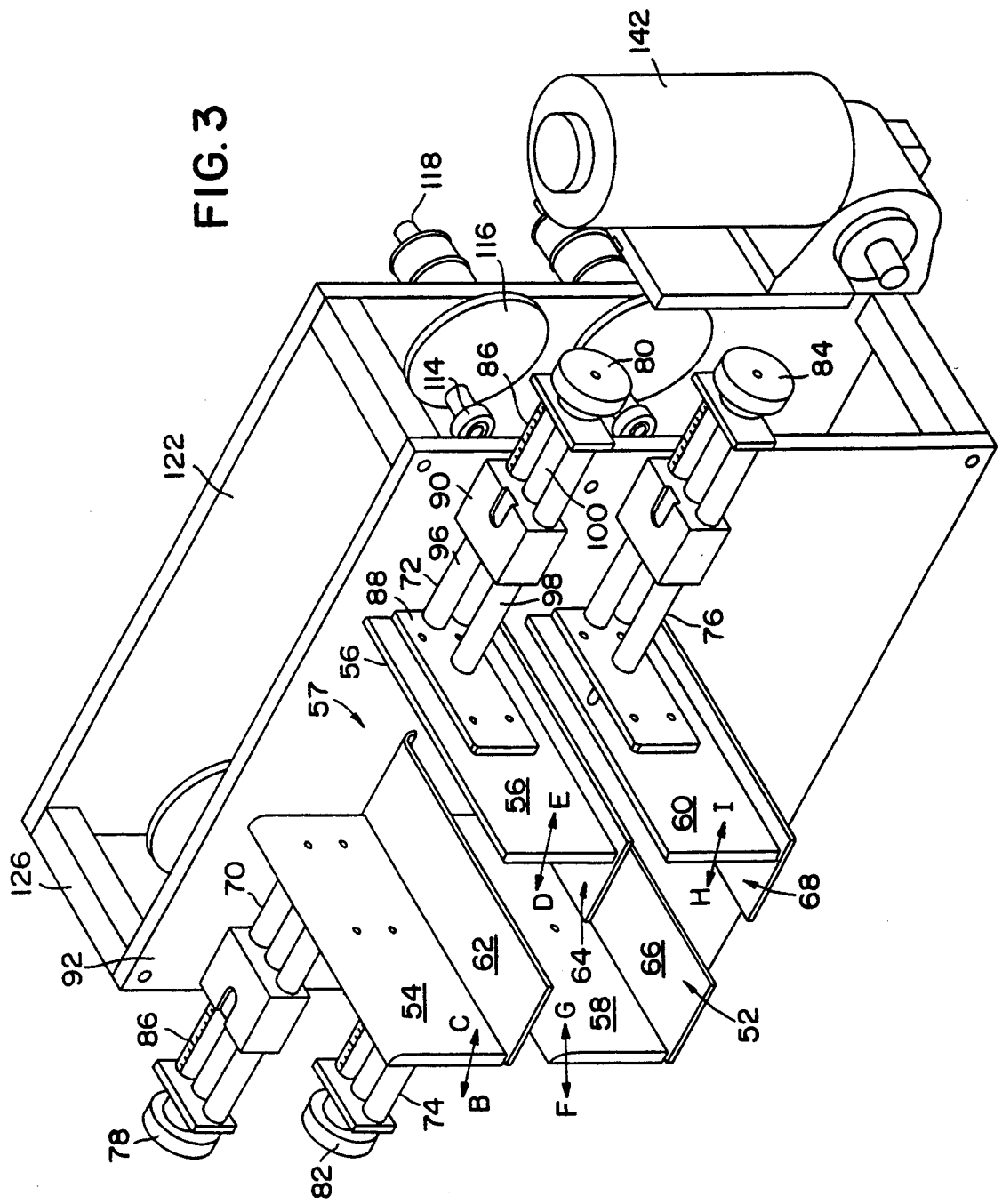
FIG. 3 is a perspective view of two bins used in connection with the loader of FIG. 2.

FIGS. 2, 3 are larger scale drawings taken from FIG. 1, showing the upper and lower bins 50, 52, respectively, that are used for delivering the pouches from conveyor 46 to the mandrels 26 on the automatic packaging machine conveyor 20 with buffer time storage inbetween. Each bin is defined by two vertical adjustable side plates 54, 56; 58, 60 and by two horizontal bottom blades 62, 64; 66, 68. These plates and blades are arranged to form two vertically aligned bins 50, 52. The side plates 54–60 are, respectively, adjustably mounted on slide rods 70–76, for reciprocal motion. By turning knobs 78–84, the side plates 54–60 may be moved back and forth in the directions B–I, respectively, to make the bin as wide or as narrow as required to prealign and deliver the product pouches.

Each of the slide rods 70–76 has an associated chart or scale 86 which visibly indicates the positions of the side plates to facilitate a setting of the widths of the bins 50, 52. This way, a user may set the machine to accomplish any suitable pouch alignment without necessarily having to experiment, as by inching the machine through a work cycle.

The operation is that conveyor 46 drops a pouch into the upper bin 50 where it rests on closed blades 62, 64. Then, blades 62, 64 are first moved in directions B, E and then returned in directions C, D in order to drop the pouch into lower bin 52 wherein it rests on closed blades 66, 68. This process is repeated any suitable number of times which have been programmed into the microprocessor in order to accumulate the number of pouches that are to be placed in a single box. After one or a selected number of pouches have been delivered, the bottom blades 66, 68 move in the directions F, I and then return in the directions G, H in order to drop the pouch or collected pouches into the underlying mandrel 26. The invention provides great flexibility so that a plurality of pouches may be accumulated in either bin.

Among other things, the two bins provide a time buffer storage. The pouches 42 are dropped into the upper bin 50 on an asynchronous time scale which matches the timing of equipment for supplying the pouches or a random delivery, as when pouches simply fall out of a bin and onto the conveyor 46. The pouches on conveyor 46 drop off the end of conveyor belt 46 (FIG. 1) on demand. The pouches 42 are dropped from the lower bin 52 and into mandrel 26 on a time scale which matches the timing of conveyor 20. Thus, within reason, it is not necessary to closely coordinate the timing of pouch delivery by a source of pouches fed into the loader 32, 34 and of the automatic packaging machine 22.

Figure 4:
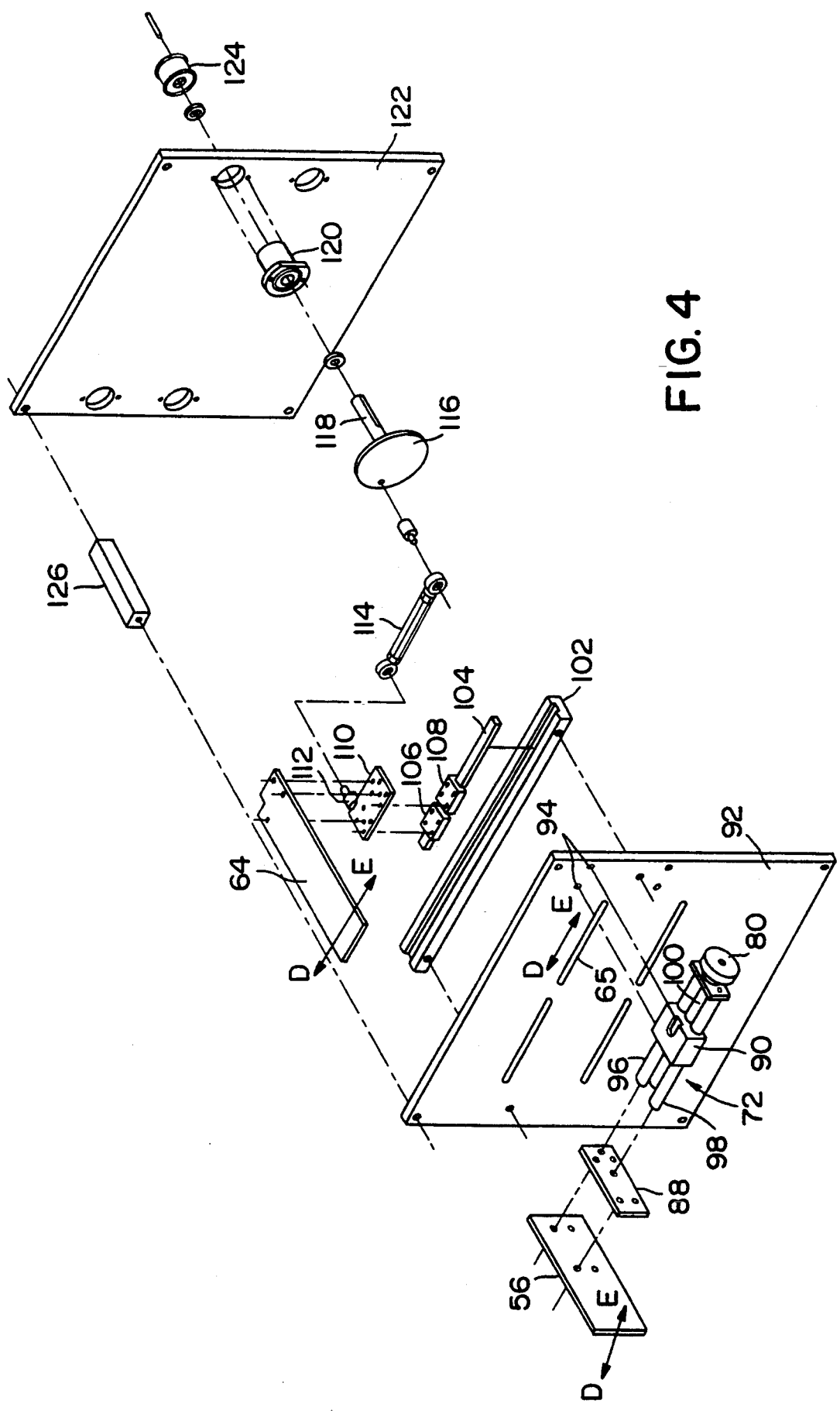
FIG. 4 is an exploded view of exemplary parts of one of the bins, the remaining parts being duplicates of the parts which are shown here.

The equipment for controlling the operation of the blades 62–64 will become more apparent from a study of FIGS. 4–8. FIG. 4 is an exploded view which shows a single side plate 56, one bin floor blade 64, and the equipment for moving them. The remaining parts required to provide the other side plates, floor blades, and moving equipment are duplicates of the parts shown in FIG. 4.

The side bin plate 56 has an attached second plate 88 which gives a vertical stability. The slide rods 72 pass through a slide block 90 attached to a front mounting plate 92 at the screw holes 94. Two slide rods 96, 98 slide through block 90 and are attached to plate 56 and plate 88. Knob 80 turns a feed screw 100 threaded through block 90 in order to move the side plate 56 of the bin in directions D, E to a location indicated by a scale or chart 86 (FIGS. 2, 3).

A guide track 102 (FIG. 4) is attached to the back of the front mounting plate 92. A preferably nylon runner 104 is positioned in the track 102 to move back and forth in directions D, E. Mounted on and moving with the runner 104 are two carrier blocks 106, 108 which are bolted to the bottom bin plate 64, which projects through slot 65 in mounting plate 92. Thus, plate 64 moves back and forth in directions D, E as the carrier blocks 106, 108 slide on runner 104.

A plate 110 is secured between carrier blocks 106, 108 and bottom bin plate 64. A bearing shaft 112 is an integral part of the plate 110. Link 114 extends between the bearing shaft 112 and an eccentric crank arm or wheel 116 in order to convert the rotary wheel 116 motion into the linear runner 104–106 motion. The crank arm or wheel 116 is mounted on a drive shaft 118 supported by bearing 120 affixed to a back mounting plate 122. A suitable collar or nut 124 is affixed on shaft 118 to hold it in place.

Suitable spacers 126 secure front and back mounting plates 92, 122 in a spaced, parallel relationship. On the back of the back mounting plate 122 (FIG. 5), the shaft 128 (similar to shaft 118) includes two pulley wheels 129, 130, each of which preferably has teeth engaging the teeth on timing or drive belts 132, 134, respectively. Any suitable motor 136 turns a driving pulley 138 which causes pulley 130, and therefore, drive shaft 128, to turn far enough through an arcuate rotation required to open and close the bottom bin plates 62. The drive shaft 118 controls the other bottom bin plate 64 via pulley 129, timing belt 134, pulley 124, and shaft 118. In a similar manner, motor 142 controls the bottom plates 66, 68 of lower bin 52 via timing belts 144, 146 and drive shafts 148, 150.

FIGS. 9 and 10 illustrate one example of an adjustable mandrel which may be used to receive and package the irregularly shaped pouches.

The product in the mandrel tray 150 includes, by way of example, three individually wrapped tubes 152, 154, 156 of soda crackers. Owing to the nature of the product, the three tubes do not have a closely controlled cross-section. The crackers may be misaligned so that each tube is, for example, an eighth of an inch wider than it should be, thus making an accumulated three-eighths of an inch of excess width. Also, depending upon where the misaligned crackers are located, there might be a much greater than normal width. The sides of the tubes may be rather irregular so that the same three tubes would not always fit together in the same way. This is shown in FIG. 9, where the tube of crackers 156 does not fit down and into mandrel tray 150. Downstream in the automatic packaging system, the out of position tube 156 may cause the system to jam.

It will be observed that, in FIG. 9, there is a substantial overlap 158 of the bottoms of mandrel tray sides 157, 159, which means that the tray is narrow so that the three tubes 152–156 of crackers must fit almost perfectly if they are to rest in side by side positions.

In FIG. 10, the tray 150 has been made much wider. Note the small overlap at 158 of the bottoms of the two tray sides 157, 159. Thus, there is not enough space within the tray 150 to receive the tubes 152–156 of crackers in a side by side relationship with a substantial space 160, 162 between them. As the tray moves from a loading position to a packaging position and becomes more narrow, the sides 157, 159 may move together to take up the space 160, 162 and make the tubes 152, 156 fit into a box as the tray 20.

FIG. 11 is an exploded view of the mandrel tray. The mandrel tray 150 is comprised of two sheet metal side members 157, 159 (with a generally "L-shaped" cross-section) which slidingly fit over each other in the bottom region. Two bars 168, 170 are attached to the bottoms of tray halves 157, 159 to provide anchor points and, also, to provide strength and rigidity to the trays. A pair of guide rails 172, 174 are held in a spaced parallel relationship by a support bar 176. Four nylon bearing blocks 178–184 are mounted to slide along the rails 172, 174. The side bars 168, 170 are mounted on the nylon bearing blocks 178–184 so that they may slide back and forth in directions J, K.

An eccentric crank or rotary member 186 is mounted to rotate in a space which is always at the center of the tray, regardless of its width. Pivotally mounted on and extending between rotary member 186 and side bars 168, 170 are two lever arms 188, 190. When the rotary member 186 turns one way (Direction L), the sides 157, 159 of the tray are pulled in by lever arms 188, 190 to reduce the tray width. When the rotary member 186 turns in an opposite direction (Direction M) the lever arms 188, 190 push out the sides 157, 159 of the tray and make it wider.

The support bar 176 has a journal 192 into which bearing 194 and an axle 196 may fit in order to rotatably support the rotary member 186. Rotary member 186 is fixed to the upper end of axle 196. On the opposite or lower end of the axle 196 is fixed a cam plate 198. A cam follower roller 200 has an axle that fits into a hole 202 in the bottom of cam plate 198. The ends of side bars 168, 170 are mounted on four nylon bearing blocks 178–184 which fit over rails 172, 174. Therefore, as the cam follower 200 turns rotary member 186, the lever arms 188, 190 move, the tray side members 157, 159 slide back and forth on the rails 172, 174.

Figure 11A:
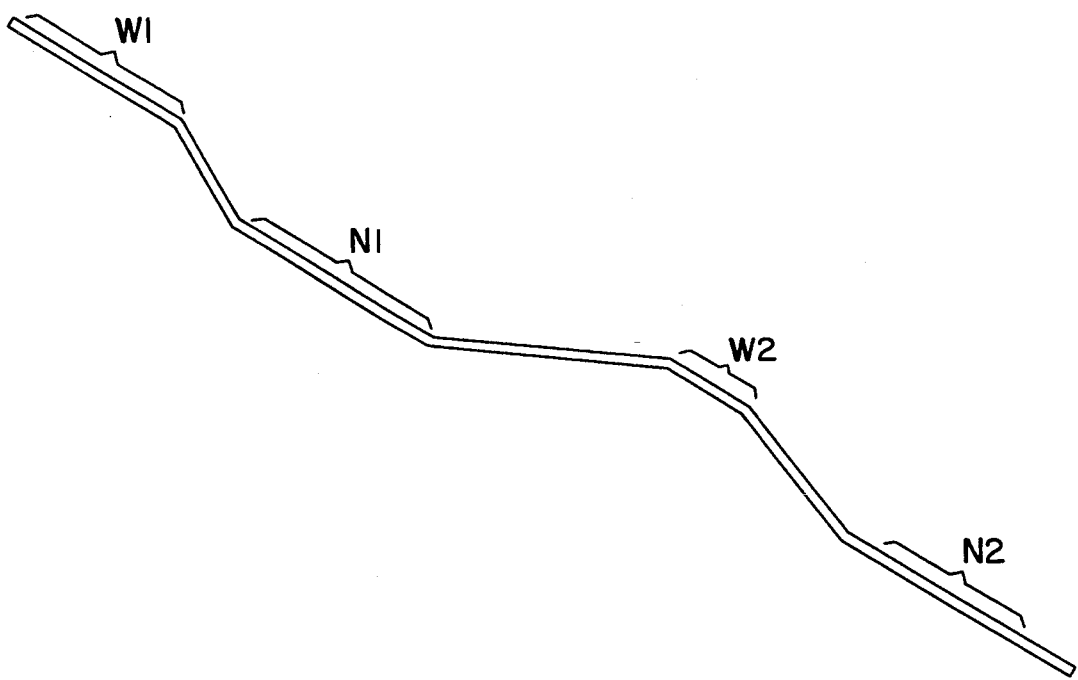
FIG. 11A shows a cam track for guiding a cam follower shown in FIG. 11.

A pair of conveyor chains 204, 206 are, broadly speaking, about the same as conveyor 20 of U.S. Pat. No. 4,829,751. They carry the mandrel 150 formed by the tray sides 157, 159 along a predetermined path represented by arrow N. A plate 208 extends between conveyor chains 204, 206 and is bolted thereto by way of brackets 210, 212. Also mounted on brackets 210, 212 are slide bars supports 214, 216. Spaced, parallel slide bars 218, 220 extend between supports 214, 216. A sliding member 222 slides back and forth (Directions P) on the bars 218, 219. The rotary member 186 has an axle 196 which fits through hole 224 in block 222 and slides within slot 226 in plate 208. Thus, the cam follower 200 has a continuous control over the rotary position of member 186 and, therefore, the width of the mandrel 150 throughout the entire excursion (Direction N). FIG. 11A shows a cam track into which the cam follower 200 fits. The cam track controls the width of the mandrel tray 150 as it travels through the automatic packaging machines. This cam track is explained in greater detail in U.S. Pat. No. 5,072,573, which shows the track sections W1, W2 making the mandrel wider and track sections N1, N2 making the mandrel narrower.

FIG. 12 includes six stop motion views showing the operation or work cycle of the inventive system. FIGS. 12A shows the upper and lower bins 50, 52 with the side plates 54–60 being adjusted in directions B–I to provide a bin width selected to receive and preposition a particular size of pouch.

Figure 12A:
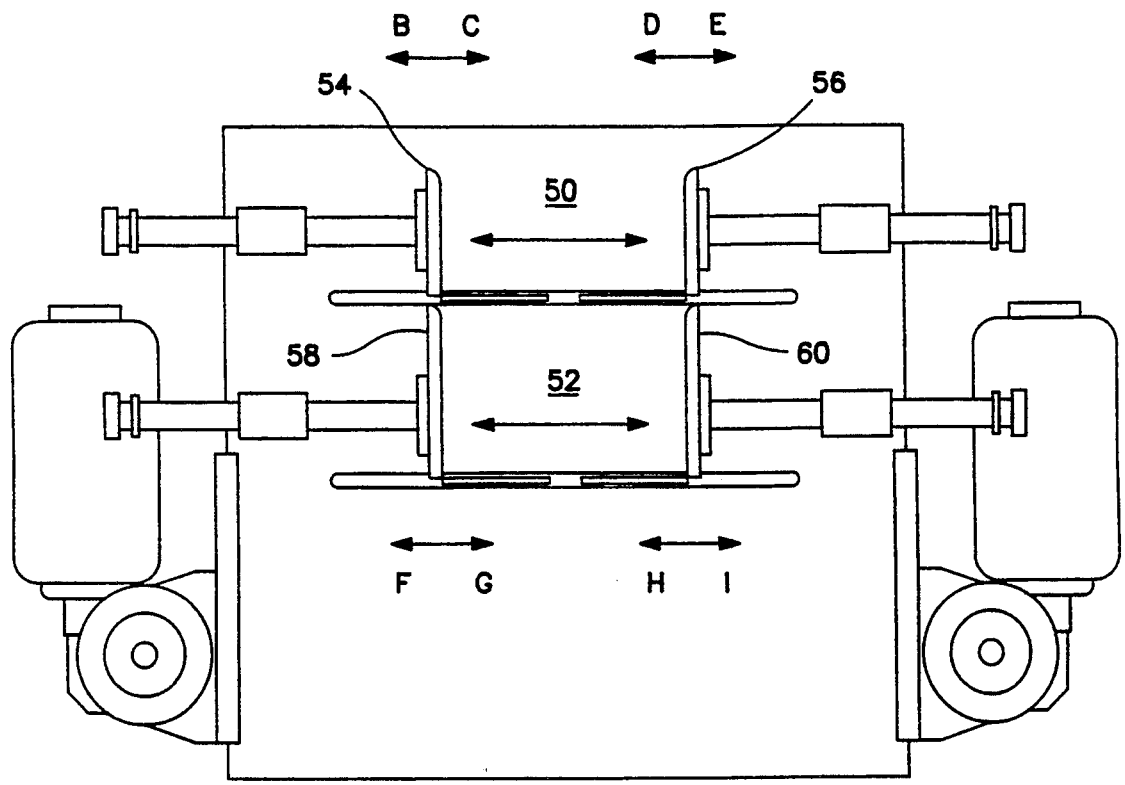
FIGS. 12A–12F are six stop motion views showing an exemplary sequence of system operations which is the loader's work cycle.
Figure 12B:
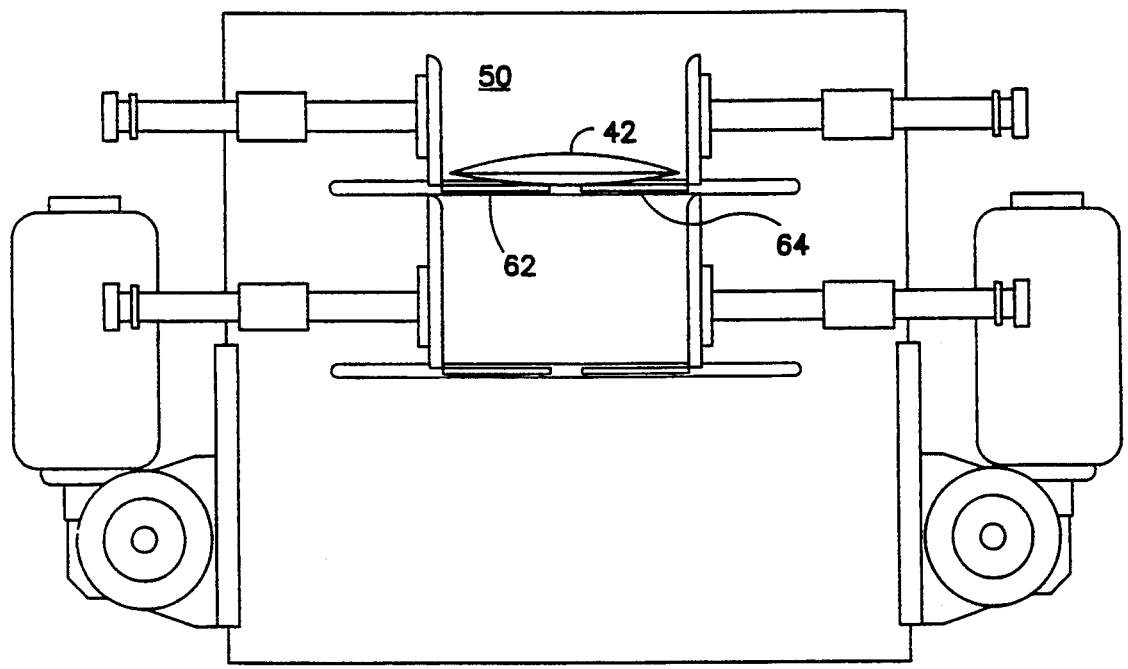

FIG. 12B shows that the pouch 42 (FIGS. 1, 2) has been deposited in upper bin 50 and is supported by bottom bin blades 62, 64. One or any suitable number of pouches may be accumulated for inclusion in a box. If only one pouch is deposited in a box, some of the steps shown here may be omitted.

Figure 12C:
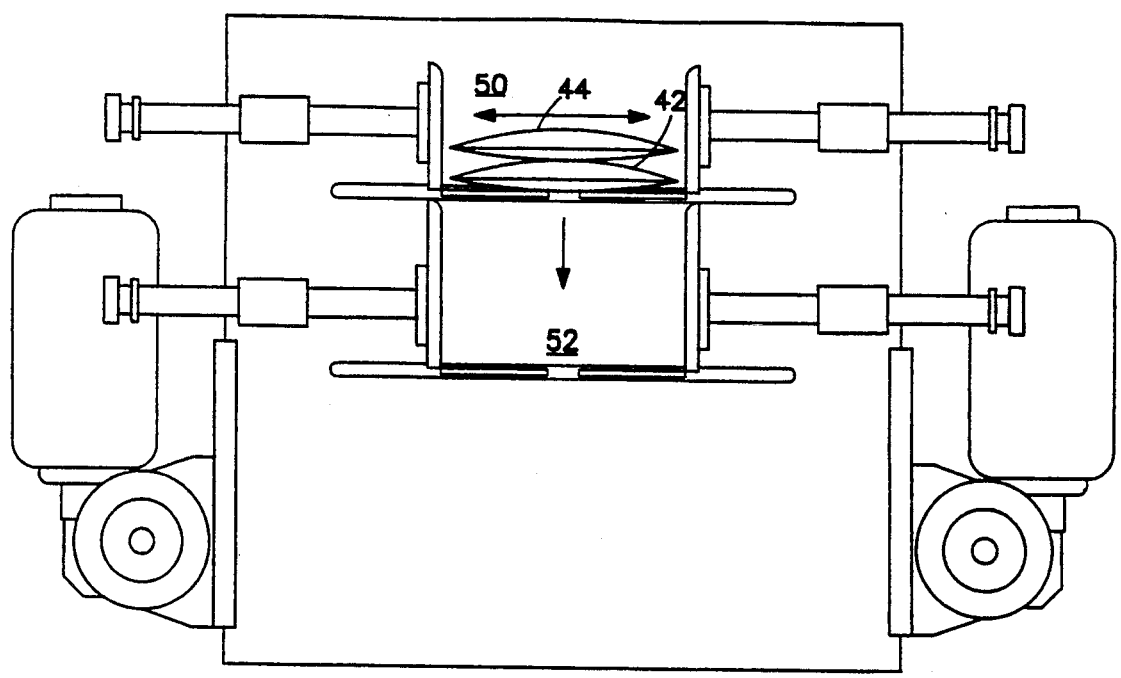

FIG. 12C shows an exemplary case where two pouches, which are to be placed in a single box, are accumulated in upper bin 50. Thus, a second pouch 44 is placed in upper bin 50. To provide a specific example, pouch 42 might be a pouch of rice and pouch 44 might be a pouch of chop suey, both of which may be placed in the same box and then frozen. Also, the system may be programmed to accumulate pouches in either the upper or lower bins 50, 52 according to particular packaging needs. As here shown, by way of example only, the two pouches are initially accumulated in the upper bin. In another situation, two or more pouches might have been initially accumulated in the lower bin 52.

Figure 12D:
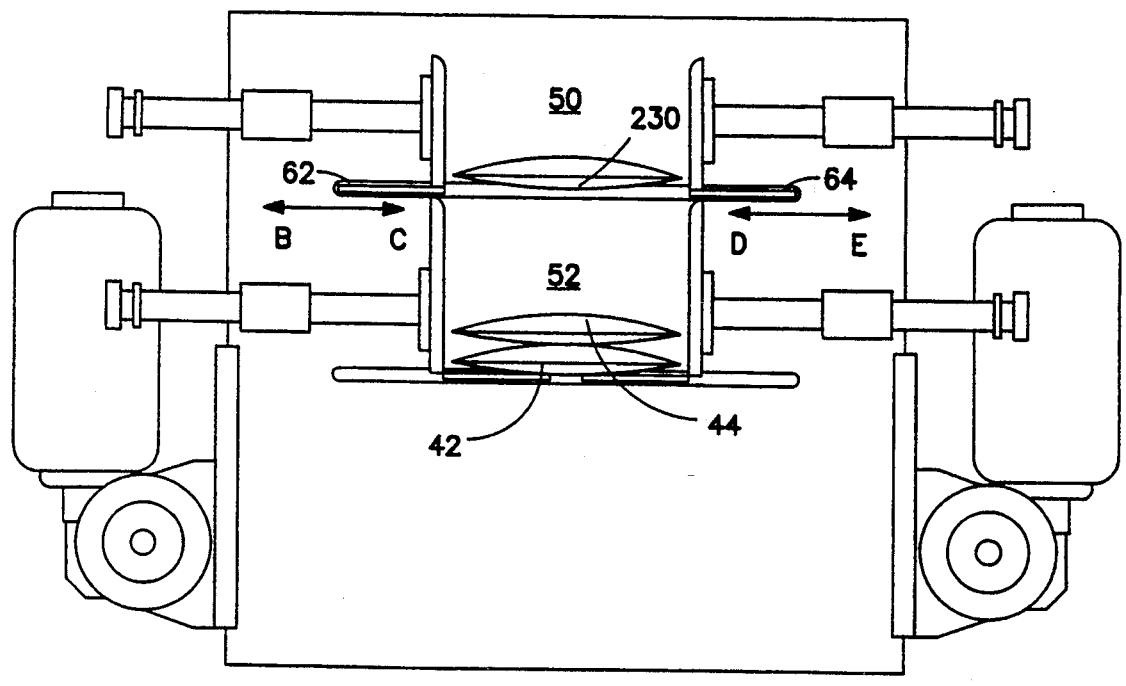

FIG. 12D shows the bottom bin blades 62, 64 have been moved in directions B, E to drop the pouches 42, 44 into lower bin 52, and then returned in directions C, D to close the bottom of the bin. The next incoming pouch 230 has been dropped into upper bin 50. In a relatively wide configuration, mandrel 26a is moving into, but has not yet reached, a loading position. Meanwhile, upper bin bottom blades 62, 64 have moved back in directions C, D to prepare bin 50 for the next drop. The sensors 38, 40 (FIG. 2) release the next pouch 230 on conveyor 46 for delivering a pouch on demand to upper bin 50.

Figure 12E:
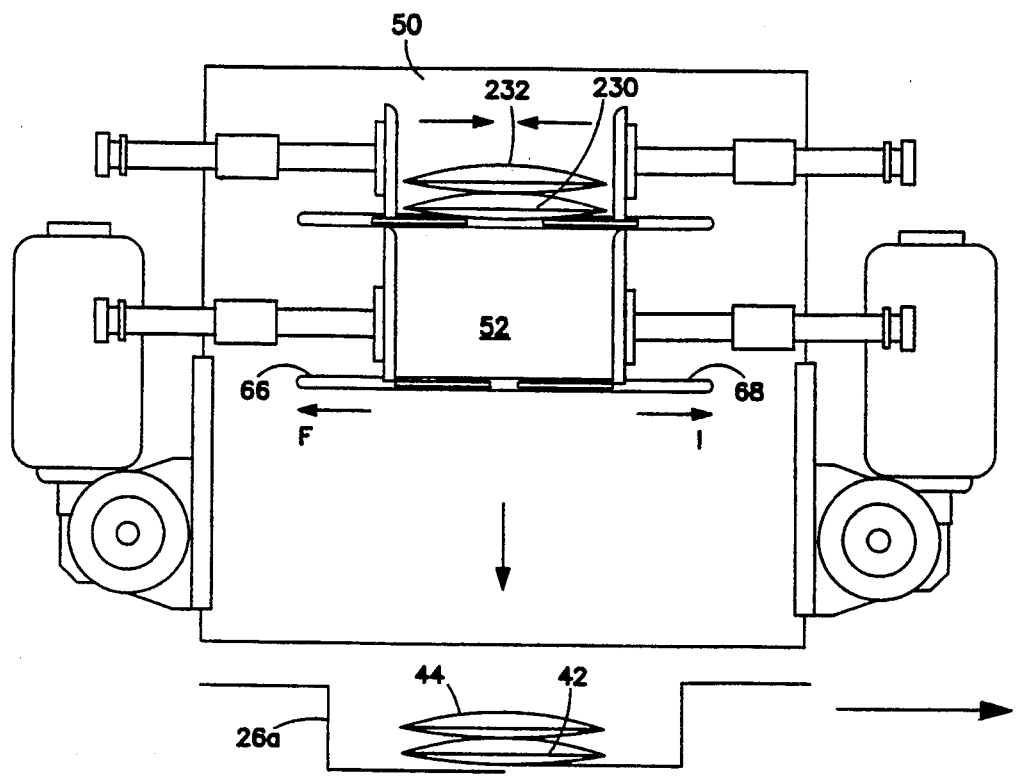

FIG. 12E shows the wide mandrel 26a directly under the lower bin 52. The lower bin bottom blades 66, 68 move outwardly in directions F, I to drop pouches 44, 42 into the wide mandrel 26a.

Figure 12F:
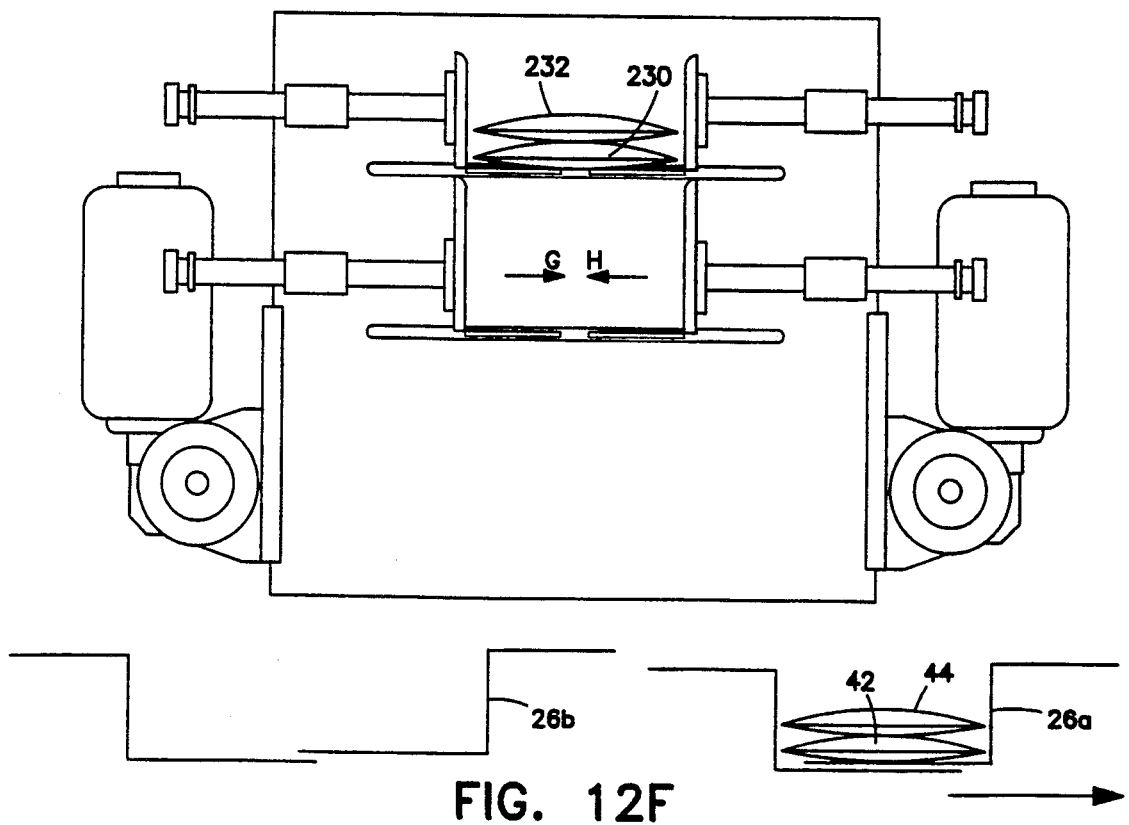

FIG. 12F shows that the bottom plates 66, 68 have returned in directions. G, H while mandrel 26a is taking pouches 44, 42 to a work station where they will be deposited into a box. At this time, mandrel 26a is becoming more narrow, shaping and pushing the pouches 44, 42 into a configuration where they will fit into the box. The next mandrel 26b is moving into position to receive the next pouches. The two bins have returned to the step in the work cycle, that is also shown in FIG. 12C.

The blades forming the bottoms of the bins may be given an oscillating motion in order to shake a product out of the bin if it has a characteristic which makes it hard to unload.

The bins 50, 52 may be mounted to move a short distance over the mandrel 26 as it moves, returning to a start position before attempting to deposit a pouch in the next following mandrel.

It should be noted from FIGS. 12D and 12E that the lower bin 52 provides a time buffer for enabling the mandrel 26 to be positioned. Thus, the loader may asynchronously load into upper bin 50 while the mandrels of the automatic packaging machine receive product from bin 52 at its timing. These two timings do not have to be synchronized.

Those who are skilled in the art will readily perceive how to modify the invention. Therefore, the appended claims are to be construed to cover all equivalent structures which fall within the true scope and spirit of the invention.

The claimed invention is:

1. A process of preconditioning and loading product in an automatic packaging machine, said method comprising the steps of:
   (a) transporting a plurality of mandrels around a path which passes at least two work stations;
   (b) making said mandrel relatively wide at one work station;
   (c) making said mandrel relatively narrow at another work station;
   (d) shaping product by adjusting the width of said mandrel between said one and other work stations; and
   (e) repeatedly adjusting the mandrel through cycles of wide and narrow configurations in order to condition product during said transporting of said mandrels around said path.

2. The process of claim 1 wherein step (b) includes depositing product in said mandrel.

3. The process of claim 1 wherein step (c) includes thrusting said product into a container.

4. An automatic packaging machine having an endless conveyor for transporting parts along an established path, said parts having a variable configuration, and means for changing said configuration as a function of an instantaneous position of said parts as they move along said established path; at least one cam track in at least one position along said established path for programming and controlling said changing of said configuration, wherein said programmed configurations of said variable configuration parts condition product.

* * * * *